(12) United States Patent
Hindi et al.

(10) Patent No.: US 8,467,095 B2
(45) Date of Patent: Jun. 18, 2013

(54) COLOR CHARACTERIZATION MODEL COMPUTATION USING WEIGHTED LEAST SQUARES MINIMIZATION

(75) Inventors: Haitham Ali Hindi, Menlo Park, CA (US); Juan Liu, I, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 540 days.

(21) Appl. No.: 12/844,412

(22) Filed: Jul. 27, 2010

(65) Prior Publication Data

US 2012/0026516 A1 Feb. 2, 2012

(51) Int. Cl.
*H04N 1/60* (2006.01)
*H04N 1/46* (2006.01)
*G03F 3/08* (2006.01)
*G06K 9/00* (2006.01)
*G09G 5/02* (2006.01)

(52) U.S. Cl.
USPC ............ 358/1.9; 358/518; 358/523; 358/524; 382/162; 382/167; 345/604

(58) Field of Classification Search
USPC ................... 358/1.9, 518, 523, 524; 382/162, 382/167; 345/604
See application file for complete search history.

(56) References Cited

U.S. PATENT DOCUMENTS

| | | | |
|---|---|---|---|
| 4,839,721 A * | 6/1989 | Abdulwahab et al. | 358/518 |
| 4,941,039 A * | 7/1990 | E'Errico | 358/518 |
| 5,305,119 A | 4/1994 | Rolleston et al. | |
| 5,528,386 A | 6/1996 | Rolleston et al. | |
| 5,612,902 A | 3/1997 | Stokes | |
| 5,818,960 A | 10/1998 | Gregory, Jr. et al. | |
| 6,809,837 B1 | 10/2004 | Mestha et al. | |
| 6,954,547 B2 * | 10/2005 | Matsushiro et al. | 382/162 |
| 2008/0239344 A1 | 10/2008 | Wang et al. | |

OTHER PUBLICATIONS

Gaurav Sharma, Wencheng Wu, Edul N. Dalal, "The CIEDE2000 Color-Difference Formula: Implementation Notes, Supplementary Test Data, and Mathematical Observations", Submitted to Color Research and Application, Feb. 9, 2004.
Gaurva Sharma, Digital Color Imaging Handbook, CRC Press, 2003.
Swati Bandyopadhyay, Tapan Paul, Tapasi Roychowdhury and Sivaji Bandyopadhyay, "A new model of printer characterization", IS&T's NIP20: 2004 International Conference on Digital Printing Technologies.
Raja Balasubramanian, The use of spectral regression in modeling halftone color printers, Journal of Electric Imaging, Apr. 1999, vol. 8(2).
Raja Balasubramanian, "Colorimetric modeling of binary color printers", pp. 1-4, 1995.
Jon Yngve Hardeberg and Francis Schmitt, Color Printer characterization using a computational geometry approach, 1998.
Raja Balasubramanian, "A spectral neugebauer model for dot-on-dot printers,", pp. 1-11, 1995.

* cited by examiner

*Primary Examiner* — Charlotte M Baker
(74) *Attorney, Agent, or Firm* — Fay Sharpe LLP (57) ABSTRACT

Methods and systems are presented for characterizing a color rendering system or a color marking material design process, in which forward color transform parameters are generated for mapping color from a first color space associated with an internal color representation of the color rendering system or marking material design process into a second color space using a least squares minimization of an error metric weighted according to a Taylor series expansion of the error metric.

26 Claims, 8 Drawing Sheets

$$\Delta E_{00}(L_1^*, a_1^*, b_1^*; L_2^*, a_2^*, b_2^*) = \Delta E_{00}^{12} = \Delta E_{00} \qquad (1)$$

$$C_{i,ab}^* = \sqrt{(a_i^*)^2 + (b_i^*)^2} \qquad i = 1, 2 \qquad (2)$$

$$\bar{C}_{ab}^* = \frac{C_{1,ab}^* + C_{2,ab}^*}{2} \qquad (3)$$

$$G = 0.5\left(1 - \sqrt{\frac{\bar{C}_{ab}^{*\,7}}{\bar{C}_{ab}^{*\,7} + 25^7}}\right) \qquad (4)$$

$$a_i' = (1 + G)a_i^* \qquad i = 1, 2 \qquad (5)$$

$$C_i' = \sqrt{(a_i')^2 + (b_i^*)^2} \qquad i = 1, 2 \qquad (6)$$

$$h_i' = \begin{cases} 0 & b_i^* = a_i' = 0 \\ \tan^{-1}(b_i^*, a_i') & \text{otherwise} \end{cases} \qquad i = 1, 2 \qquad (7)$$

$$\Delta L' = L_2^* - L_1^* \qquad (8)$$

$$\Delta C' = C_2' - C_1' \qquad (9)$$

$$\Delta h' = \begin{cases} 0 & C_1'C_2' = 0 \\ h_2' - h_1' & C_1'C_2' \neq 0; |h_2' - h_1'| \leq 180° \\ (h_2' - h_1') - 360 & C_1'C_2' \neq 0; (h_2' - h_1') > 180° \\ (h_2' - h_1') + 360 & C_1'C_2' \neq 0; (h_2' - h_1') < -180° \end{cases} \qquad (10)$$

$$\Delta H' = 2\sqrt{C_1'C_2'} \sin\left(\frac{\Delta h'}{2}\right) \qquad (11)$$

$$\bar{L}' = (L_1^* + L_2^*)/2 \tag{12}$$

$$\bar{C}' = (C_1' + C_2')/2 \tag{13}$$

$$\bar{h}' = \begin{cases} \frac{h_1' + h_2'}{2} & |h_1' - h_2'| \leq 180°; C_1'C_2' \neq 0 \\ \frac{h_1' + h_2' + 360°}{2} & |h_1' - h_2'| > 180°; (h_1' + h_2') < 360°; C_1'C_2' \neq 0 \\ \frac{h_1' + h_2' - 360°}{2} & |h_1' - h_2'| > 180°; (h_1' + h_2') \geq 360°; C_1'C_2' \neq 0 \\ (h_1' + h_2') & C_1'C_2' = 0 \end{cases} \tag{14}$$

$$T = 1 - 0.17\cos(\bar{h}' - 30°) + 0.24\cos(2\bar{h}')$$
$$+ 0.32\cos(3\bar{h}' + 6°) - 0.20\cos(4\bar{h}' - 63°) \tag{15}$$

$$\Delta\theta = 30\exp\left\{-\left[\frac{\bar{h}' - 275°}{25}\right]^2\right\} \tag{16}$$

$$R_C = 2\sqrt{\frac{\bar{C}'^7}{\bar{C}'^7 + 25^7}} \tag{17}$$

$$S_L = 1 + \frac{0.015(\bar{L}' - 50)^2}{\sqrt{20 + (\bar{L}' - 50)^2}} \tag{18}$$

$$S_C = 1 + 0.045\bar{C}' \tag{19}$$

$$S_H = 1 + 0.015\bar{C}'T \tag{20}$$

$$R_T = -\sin(2\Delta\theta)R_C \tag{21}$$

$$\Delta E_{00}^{12} = \Delta E_{00}(L_1^*, a_1^*, b_1^*; L_2^*, a_2^*, b_2^*)$$
$$= \sqrt{\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T\left(\frac{\Delta C'}{k_C S_C}\right)\left(\frac{\Delta H'}{k_H S_H}\right)} \tag{22}$$

COLOR CHARACTERIZATION MODEL COMPUTATION USING WEIGHTED LEAST SQUARES MINIMIZATION

BACKGROUND

The present disclosure is generally related to the field of color characterization for color rendering devices or systems such as image/text printing or display systems and/or for color characterization of toner, ink, paint or other color marking material design processes. Characterizing the underlying mapping (forward transform) from a printer or display's internal color space (e.g., CMY, CMYK, etc.) or of a material design process space (e.g., mixture ratios of pigments, colorants, surfactants, magnetic materials, carriers, or other constituent components that affect color) to a perceived print-out/display color space (e.g., La*b* or other color spectrum) is important to achieving color consistency within and across color reproduction devices and marking material production processes. In practice, this color mapping varies from device to device and from process to process, and varies over time in a single device, due to physical conditions such as temperature, humidity, inks or other marking materials, printed media type (e.g., paper stock type, thickness), component wear and tear, and manufacturing tolerances associated with the reproduction devices. In printers or display devices, moreover, the forward color mapping characterization facilitates adjustments in the rendering process via control algorithms to adjust individual devices in order to achieve color consistency across product lines and over time. Color mapping transforms or models can be assessed in terms of accuracy with respect to human perceptions of color or another metric. The DeltaE2000 (dE2K) metric is one such scoring function or error metric for evaluating the accuracy of color models used in characterizing printing and display devices or color marking material design processes. However, the dE2K metric has a very complicated functional representation, whereby conventional color device or design process characterization methods do not directly use dE2K or other more accurate metrics in model generation.

BRIEF DESCRIPTION

Methods and systems are provided for characterizing a color rendering system or a color marking material design process or display process by generating parameters of a forward color transform at least partially according to an input characterization data set and a measured characterization data set to map color from a first color space to a second color space using a weighted least squares minimization of an error metric that is weighted according to a Taylor series expansion of the error metric.

In accordance with various aspects of the present disclosure, a method is provided for characterizing a color rendering system or a color marking material design process. The method includes producing test images according to an input characterization data set of a first color space (e.g., C, M, Y; C, M, Y, K; RGB; XYZ; process colorant pigment mix ratios; etc.) using the color rendering system or color marking material design process, and measuring the test images to generate a measured characterization data set in a second color space (e.g., CIELAB) that represents measurements of observed color values. The test images in certain embodiments are produced using a color rendering system such as a printer, display, etc., and the forward color transform maps color from the first color space associated with an internal color representation of the color rendering system into the second color space. In other embodiments, the test images are produced using materials created according to a color marking material design process (e.g., toner design, ink design, paint mixing, etc.), and the forward color transform maps color from the first color space associated with an internal color representation of the color marking material design process into the second color space. Using a processor, forward color transform parameters are computed or generated for a forward color transform that maps color from the first color space into the second color space using a least squares minimization of an error metric weighted according to a Taylor series expansion of the error metric at least partially according to the input characterization data set and the measured characterization data set.

In certain embodiments, the error metric is a twice differentiable error metric in which the distance from any point to itself is zero and the first derivative of the error metric at zero distance from any point is zero, for example, the DeltaE2000 (dE2K) error metric.

In certain embodiments, the error metric is weighted according to a second gradient (Hessian) of the dE2K error metric evaluated at each point in the input characterization data set. These quantities can also be approximated using any one of a number numerical differentiation techniques.

In certain C, M, Y, K embodiments, moreover, forward color transform parameters $\Theta_L$, $\Theta_a$, and $\Theta_b$ are computed for a forward color transform $f_\Theta(cmyk)$ using a weighted least squares minimization of the following equation:

$$\min_\Theta \sum_{i=1}^{N} \frac{1}{2} \| Q^{1/2}(Lab_i) \cdot (f_\Theta(cmyk_i) - Lab_i) \|_2^2$$

where $cmyk_i$ are data points of the input characterization data set, $Lab_i$ are data points of the measured characterization data set, and $Q^{1/2}(Lab_i)$ is an error metric weighting determined according to a Taylor series expansion of the dE2K error metric. In certain embodiments, $Q^{1/2}(Lab_i)$ is the second derivative matrix $\nabla^2 dE2K_i(Lab_i)$ of the dE2K error metric. These may be approximated using one or more numerical differentiation techniques, for example, with approximations computed numerically using the following equations:

$$\frac{\partial dE2K_i(Lab_i)}{\partial Lab_i} = \frac{dE2K_i(Lab_i + he_i) - dE2K_i(Lab_i)}{h}$$

$$\frac{\partial^2 dE2K_i(Lab_i)}{\partial Lab_i \partial Lab_j} = \frac{\frac{\partial dE2K_i(Lab_i + he_i)}{\partial Lab_j} - \frac{\partial dE2K_i(Lab_i)}{\partial Lab_j}}{h^2}$$

where $Lab_i$ are data points in the measured characterization data set, h is a small positive number (e.g., 1 in exemplary implementations), and $e_i$ are unit vectors in the second color space (La*b*-space).

In accordance with further aspects of the disclosure, a system is provided for characterizing a color rendering system or a color marking material design process. The system includes a processor that computes forward color transform parameters for a forward color transform that maps color from a first color space associated with an internal color representation of the color rendering system or the color marking material design process into a second color space using a least squares minimization of an error metric weighted according to a Taylor series expansion of the error metric at least partially according to an input characterization data set of a first color space and a measured characterization data set in a second color space representing measurements of observed color values. In certain embodiments, characterization system is integrated in the color rendering system.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Referring now to the drawings, the disclosure provides techniques to facilitate use of the DeltaE2000 and other metrics more directly in the color model computation phase for printers/displays/material design processes using weights obtained from a second order Taylor expansion of the metric to provide local quadratic approximations to the dE2K function or other metric. The approximations can then be used to construct a weighted least squares problem, which more accurately captures the spatial inhomogeneity of the dE2K function while circumventing the functional complexity of the dE2K metric by doing the differentiation numerically. Preliminary studies show that color models computed with this technique are 5-10% more accurate than conventional techniques and larger accuracy gains are believed to be possible particularly if implemented as part of a multicell method.

Figure 5A:
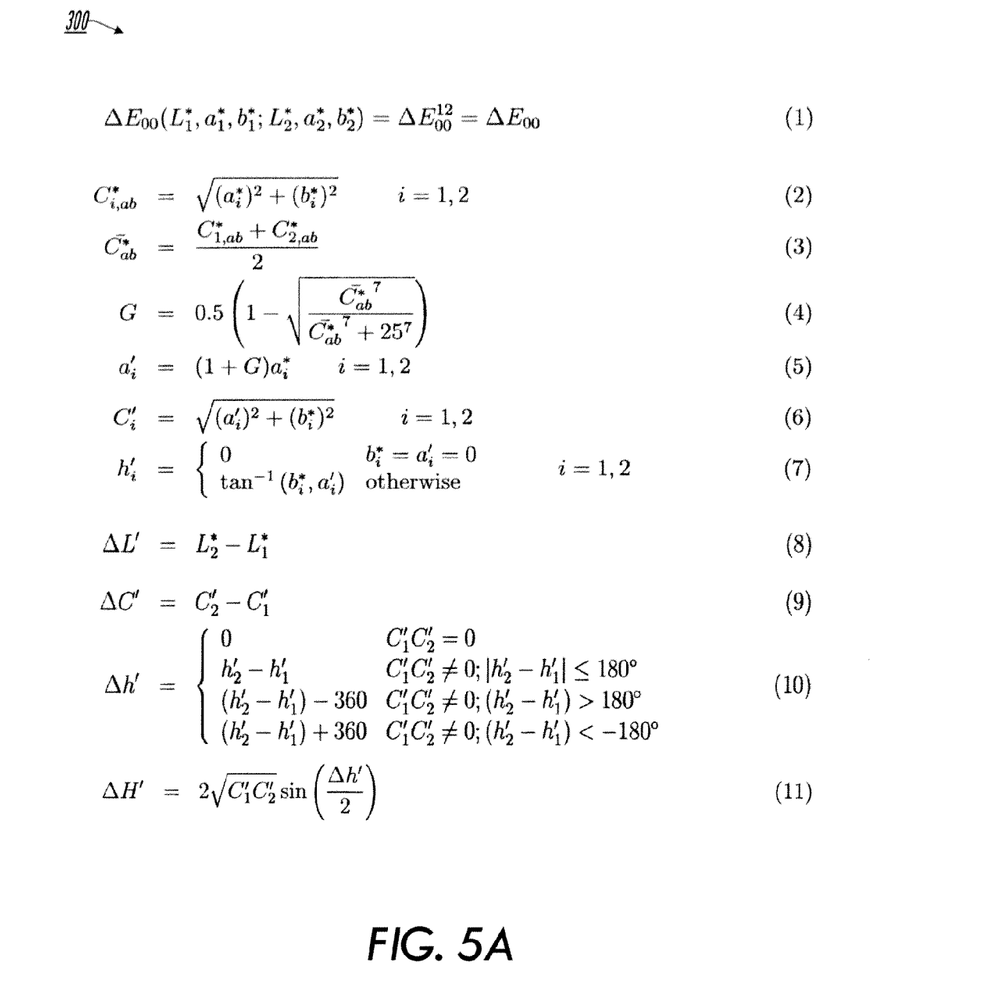
FIGS. 5A and 5B are schematic diagrams illustrating the formulas for the DeltaE2000 (dE2K) error metric.
Figure 5B:
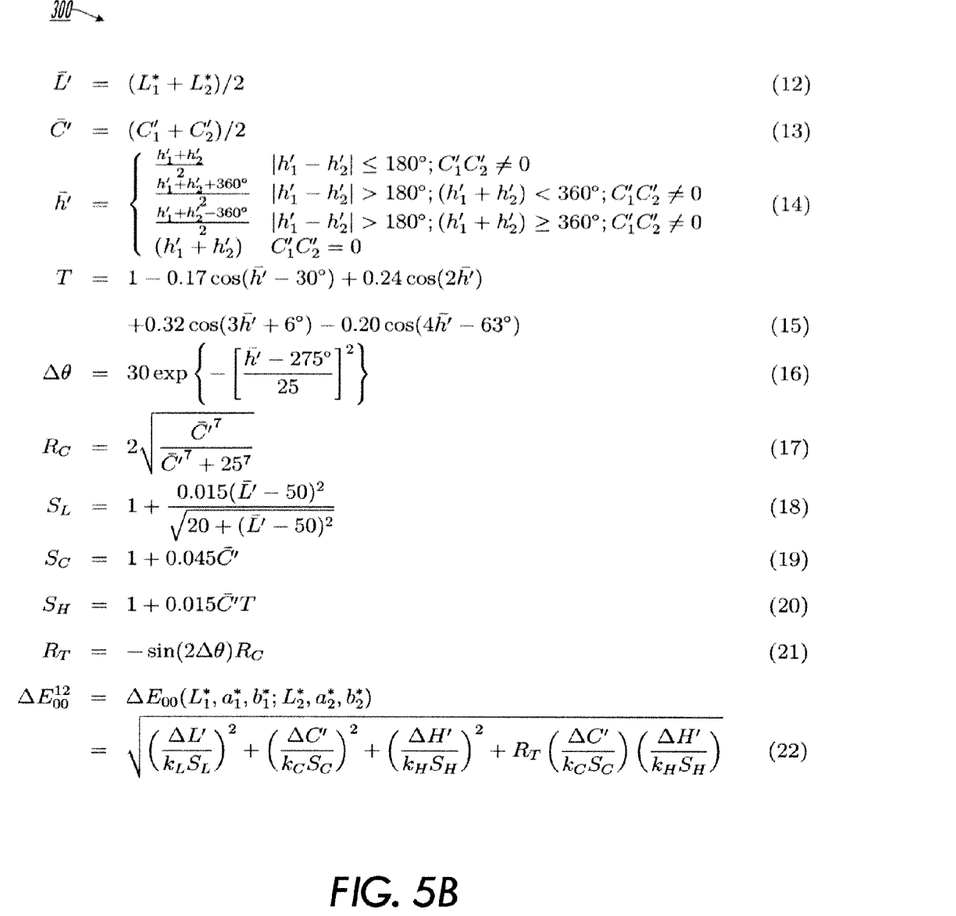

Referring initially to FIGS. 5A and 5B, the formulas for the DeltaE2000 (dE2K) metric 300 is shown, which is a primary scoring function $f$ or measuring the accuracy of color models used in characterizing printing and display devices. These color models are computed from input/output data by parameter fitting using regression methods. The dE2K metric was designed to capture the fact that human sensitivity to errors in color is quite inhomogeneous across the color space, being highest for bright colors and dependent on the direction of the error as well.

Unfortunately, the dE2K metric has a very complicated functional representation, rendering it difficult for analytical manipulation. As a result, most of the current models in use today do not use the dE2K metric explicitly in the computation of their color model parameters. Instead, standard metrics, such as the Euclidean or Max metrics, are used in the design computations and, only afterwards, the scoring of model error performance is done with dE2K.

Figure 1:
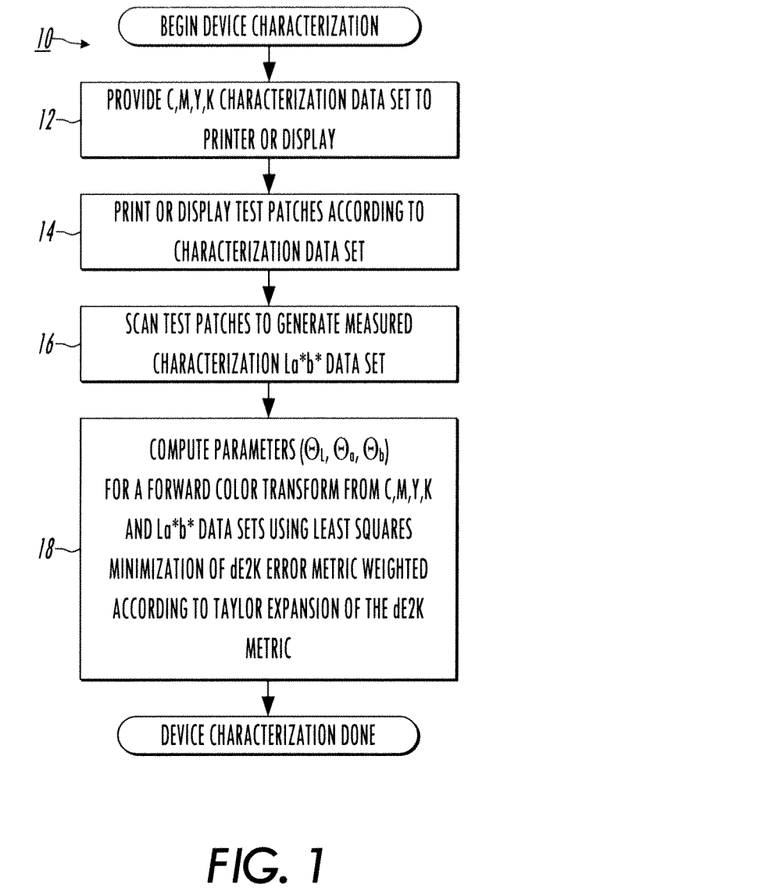
FIG. 1 is a flow diagram illustrating an exemplary color printer device characterization process in accordance with various aspects of the disclosure.
Figure 2:
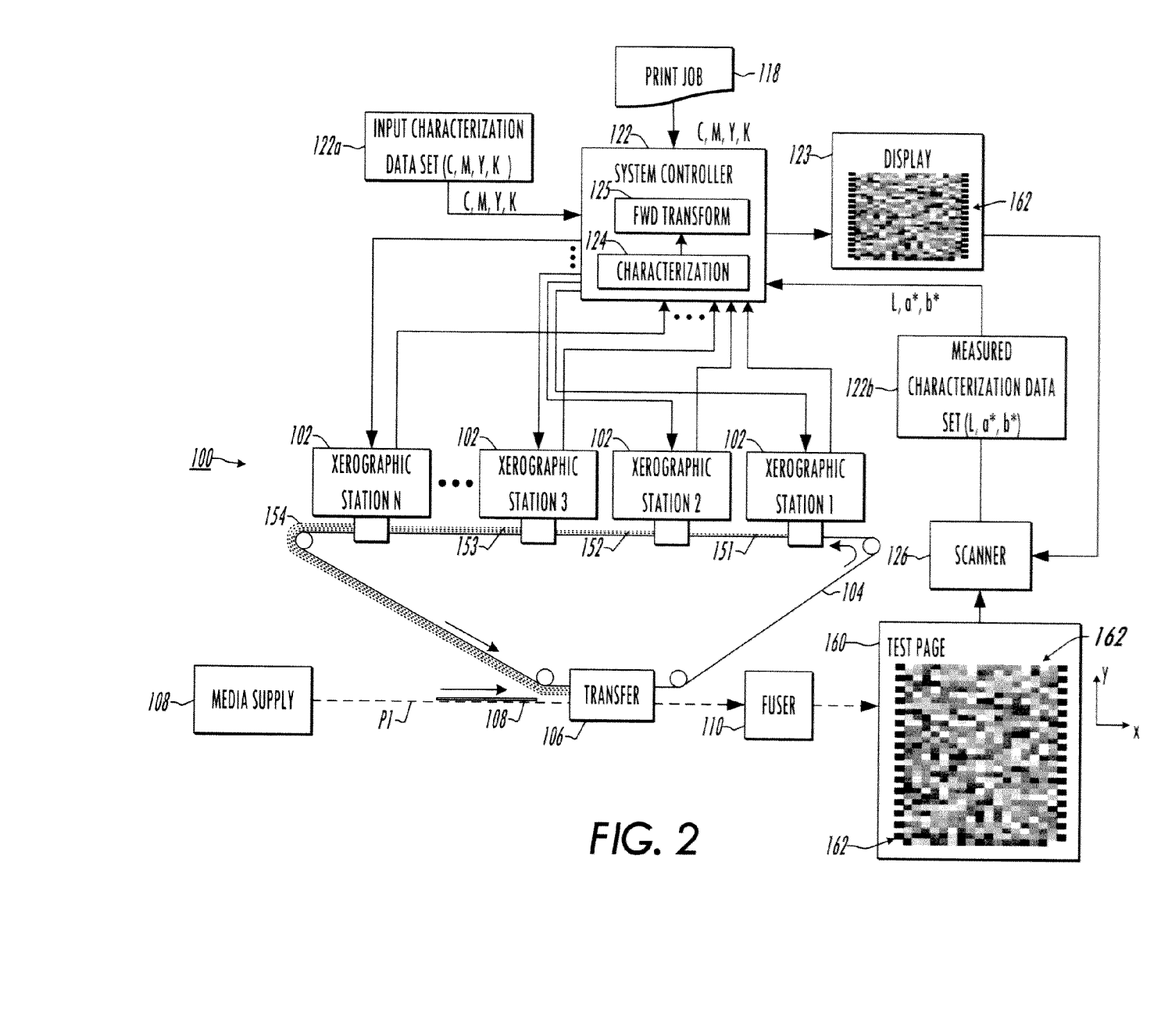
FIG. 2 is a simplified schematic system level diagram illustrating an exemplary multi-color document processing system with a characterization system in accordance with the disclosure.
Figure 3:
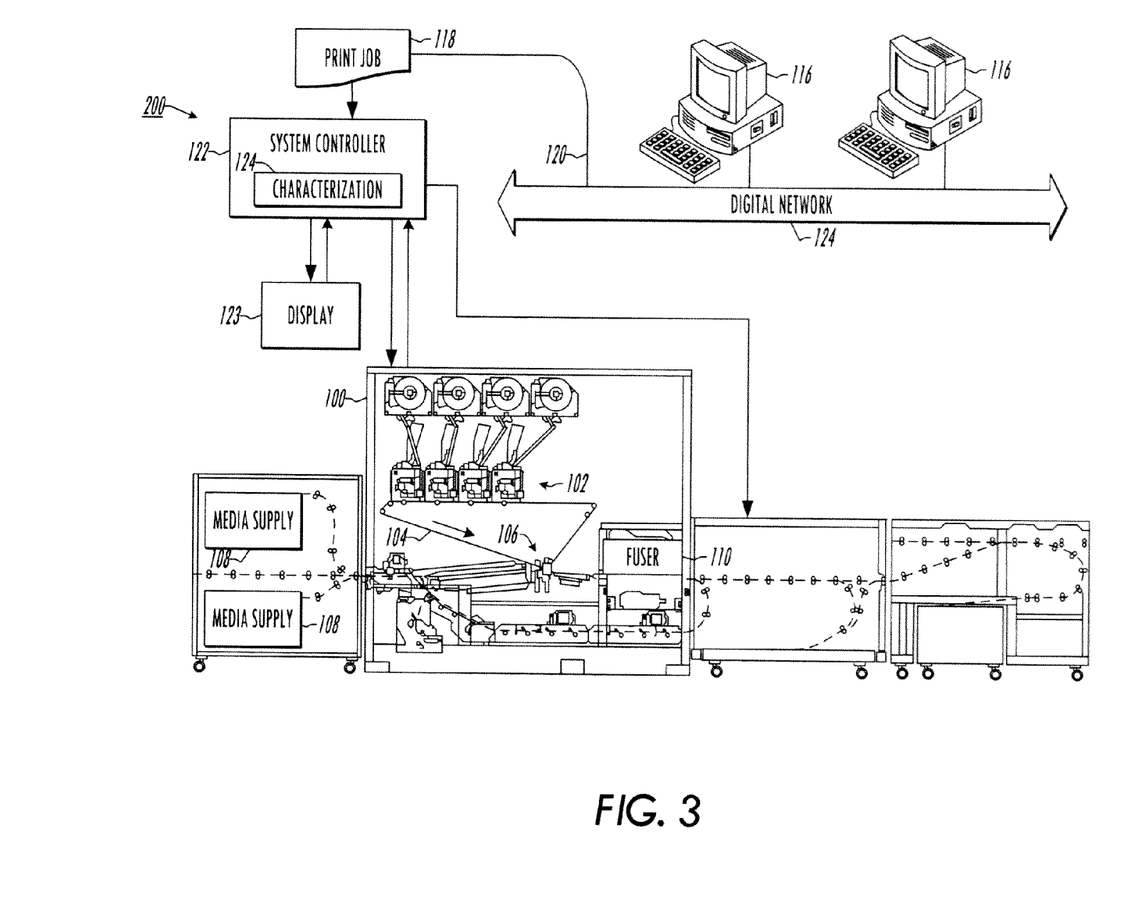
FIG. 3 is a detailed side elevation view illustrating an exemplary embodiment of the system of FIG. 2 in accordance with the disclosure.
Figure 4:
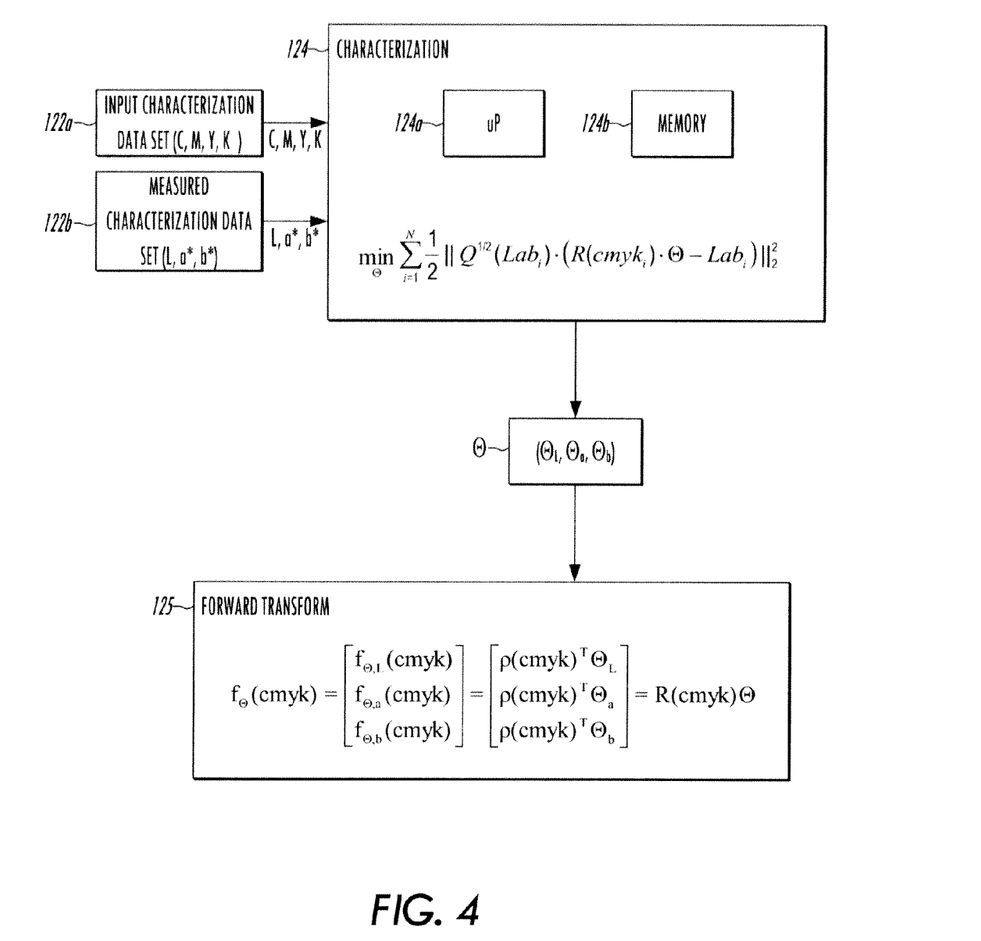
FIG. 4 is a schematic diagram illustrating further details of the characterization system of FIGS. 2 and 3 according to the disclosure.
Figure 7:
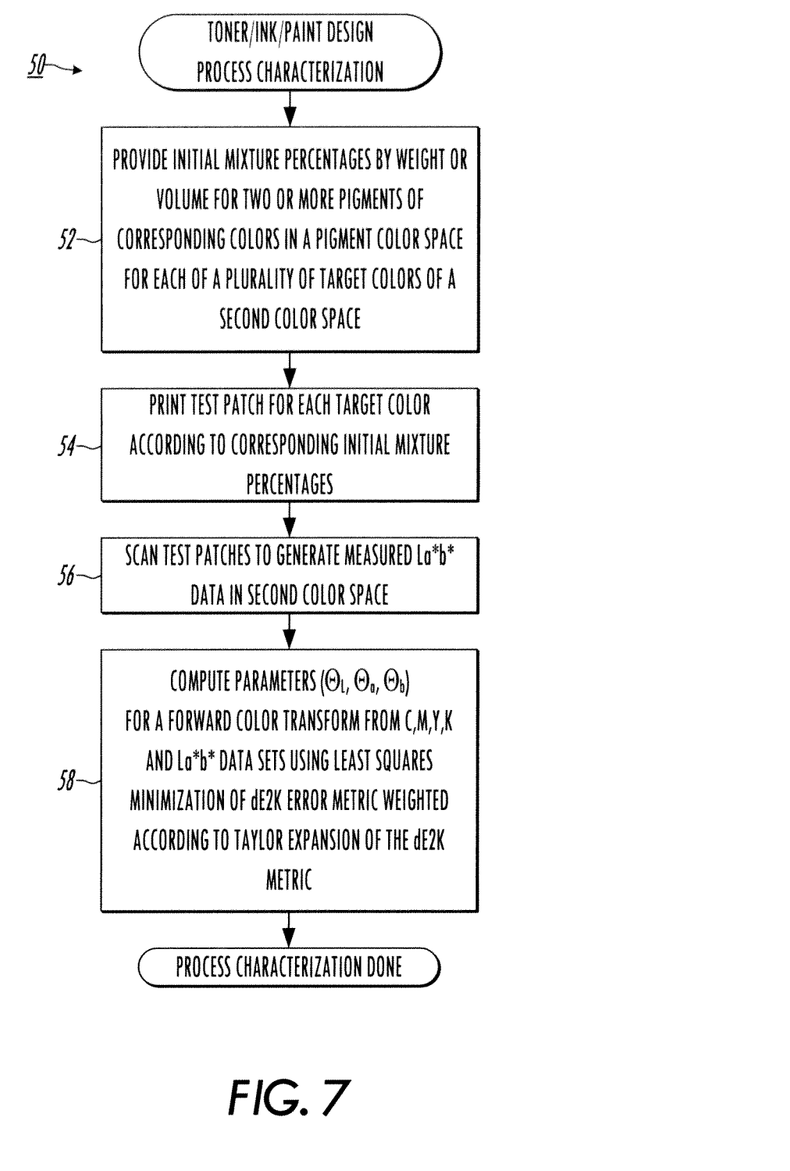
FIG. 7 is a flow diagram illustrating an exemplary characterization process for a color marking material design process according to the disclosure.

Referring now to FIGS. 1-4 and 7, methods and systems are provided for characterizing a color rendering system or a color marking material design process by generating parameters of a forward color transform at least partially according to an input characterization data set and a measured characterization data set to map color from a first color space to a second color space using a weighted least squares minimization of an error metric that is weighted according to a Taylor series expansion of the error metric. FIG. 1 shows an exemplary color printer device characterization process or method 10, FIG. 7 illustrates an exemplary characterization process for a color marking material design process 50 according to the disclosure, and FIGS. 2-4 depict exemplary printing systems or devices 100 with system controllers 122 and characterization systems 124 in which the method 10 may be implemented. While the exemplary methods 10, 50 of FIGS. 1 and 7 are illustrated and described below in the form of a series of acts or events, the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods 10, 50, moreover, may be implemented in hardware, processor-executed software, or combinations thereof, whether in a single characterization system 124 or in distributed form in two or more components or systems, in order to characterize a color printing device, color display or other color reproduction device or process such as toner design or ink mixing processes, and may be employed in any form of printing system including without limitation desktop printers, computers, network printers, stand-alone copiers, multi-function printer/copier/facsimile devices, high-speed printing/publishing systems and digital printing presses, digital cameras, etc. wherein the disclosure is not limited to the specific applications and implementations illustrated and described herein.

The device/system characterization process 10 in FIG. 1 includes providing or receiving a characterization data set at 12 (e.g., C, M, Y or C, M, Y, K data set 122a in FIGS. 2 and 4 below) in a first (e.g., device dependent) color space. In one example for an 8-bit C, M, Y, K space, the input initial characterization set 122a is derived from a $16^4$ grid in which each of the C, M, Y, K dimensions is a uniform 16-level grid taking values in the range from 0 to 255. At 14, a plurality of visible test images (e.g., test patches 162 in FIG. 2 below) are rendered (e.g., printed or displayed) according to the input characterization data set 122a using a color rendering system (e.g., printers 100, 200 in FIGS. 2 and 3). At 16, the test images 162 are measured to generate a measured characterization data set (e.g., Lab data set 122b) in a second color space (e.g., CIELAB) which represents measurements of observed color values. In the examples of FIGS. 2-4, the test patches 162 are scanned at 16 to generate the measured characterization (La*b*) data set 124b. The method 10 further includes computing forward color transform parameters (e.g., $\Theta_L$, $\Theta_a$, $\Theta_b$) at 18 for a forward color transform ($f_\Theta$ (cmyk) 125 in FIG. 4) that maps color from the first color space (e.g., C, M, Y, K) associated with the internal color representation of the rendering system 100, 200 into the second color space (e.g., CIELAB) using a least squares minimization of an error metric weighted according to a Taylor series expansion of the error metric at least partially according to the input characterization data set 122a and the measured characterization data set 122b. In operation, the forward transform can be used to generate a backward transform used in operation of the system 100, 200.

In certain embodiments, the error metric is a twice differentiable error metric, where the distance from any point to itself is zero for the error metric, and where the first derivative of the error metric at zero distance from any point is zero, such as the DeltaE2000 dE2K error metric. In computing the parameters of the transform at 18, the error metric in certain embodiments is weighted according to a Hessian of the dE2K error metric evaluated at each point in the input characterization data set 122a. If the error metric f is difficult to differentiate analytically, the gradient and Hessian may be computed using one or more numerical techniques, for example, using the following equations:

$$\frac{\partial f}{\partial x_i}(x) = \frac{f(x+he_i) - f(x)}{h}$$

$$\frac{\partial^2 f}{\partial x_i \partial x_j}(x) = \frac{\frac{\partial f}{\partial x_j}(x+he_i) - \frac{\partial f}{\partial x_j}(x)}{h^2}$$

where x are the data points in the second color space in the measured characterization data set 122b, h is integer small positive number, and $\Theta_i$ are unit vectors in the second color space.

In an exemplary CMYK embodiment, forward color transform parameters $\Theta_L$, $\Theta_a$, and $\Theta_b$ are computed for the forward color transform $f_\Theta(cmyk)$ 125 using a weighted least squares minimization of the following equation:

$$\min_\Theta \sum_{i=1}^{N} \frac{1}{2} \| Q^{1/2}(Lab_i) \cdot (f_\Theta(cmyk_i) - Lab_i) \|_2^2$$

where $cmyk_i$ are data points of the input characterization data set 122a, $Lab_i$ are data points of the measured characterization data set 122b, and $Q^{1/2}(Lab)$ is an error metric weighting determined according to a Taylor series expansion of the dE2K error metric. In this embodiment, the weighting $Q^{1/2}(Lab_i)$ is the second derivative matrix $\nabla^2 dE2K_i(Lab_i)$ of the dE2K error metric. These can be approximated numerically using the following equations:

$$\frac{\partial dE2K_i(Lab_i)}{\partial Lab_i} = \frac{dE2K_i(Lab_i + he_i) - dE2K_i(Lab_i)}{h}$$

$$\frac{\partial^2 dE2K_i(Lab_i)}{\partial Lab_i \partial Lab_j} = \frac{\frac{\partial dE2K_i(Lab_i + he_i)}{\partial Lab_j} - \frac{\partial dE2K_i(Lab_i)}{\partial Lab_j}}{h^2}$$

where $Lab_i$ are data points, in the measured characterization data set 122b, h is a small positive number (e.g., 1 in certain examples), and $\Theta_i$ are the unit vectors $e_L$, $e_a$, $e_b$, in the second color space, ie, the La*b* space.

FIG. 7 illustrates an exemplary characterization process 50 for a color marking material design process for designing toner, ink, paint, or other color marking material. In this example, an input characterization data set 122a is provided at 52, such as initial mixture percentages by weight or volume for two or more pigments of corresponding colors in a pigment color space for each of a plurality of target colors of a second color space. The test patches are created at 54 using any suitable marking process and equipment for each target color according to the initial characterization data set 122a. The test patches are scanned at 56 to generate the measured characterization (La*b*) data set 124b, and the parameters are computed at 58 for a forward color transform ($f_\Theta$(cmyk)) that maps color from the first color space (e.g., C, M, Y, K) associated with the internal color representation of the color marking material design process into the second color space (e.g., CIELAB) using a least squares minimization of an error metric weighted according to a Taylor series expansion of the error metric at least partially according to the input characterization data set 122a and the measured characterization data set 122b.

Referring again to FIGS. 2-4, an exemplary color processing devices 100, 200 include a rendering system with xerographic stations 102 and a display 123, either or both of which operate to produce visible images according to input color data. The devices 100 and 200 further include a system controller 122 which provides input (e.g., C, M, Y, K) color data to the rendering system 102, 123 according to a print job 118, as well as a scanner type sensor 126 that generates measured (e.g., L, a*, b*) data 124a, 124c representative of the perceivable spectral content of printed or displayed visible images 162. The scanner 126 in certain embodiments may be integrated into the rendering system for in-line scanning of printed images 162 on test pages 160. The system 100 in FIG. 2 is a tandem multi-color document processing device with marking devices 102 individually operable according to control signals or data from the controller 122 to transfer toner marking material 151-153 onto an intermediate substrate 104 that may or may not be a photoreceptor, in this case, a shared intermediate transfer belt (ITB) 104 traveling in a counter clockwise direction in the figure past the xerographic marking devices 102 (also referred to as marking engines, marking elements, marking stations, etc.). In other embodiments, a cylindrical drum may be employed as an intermediate transfer substrate, with the marking devices 102 positioned around the periphery of the drum to selectively transfer marking material thereto. In addition, this could be used for other marking or display technologies, such as ink jet, DRT, LCD, projectors, etc.

FIG. 3 shows another exemplary system 200 having four marking devices 102 configured along a shared or common intermediate transfer belt 104. This system 200 includes marking stations 102 along with a transfer station 106, a supply of final print media 108, and a fuser 110 as described in FIG. 2 above. In normal operation, print jobs 118 are received at the controller 122 via an internal source such as an in-line or outboard scanner 126 (FIG. 2) and/or from an external source, such as one or more computers 116 connected to the system 100 via one or more networks 124 and associated cabling 120, or from wireless sources. The print job execution may include printing selected text, line graphics, images, magnetic ink character recognition (MICR) notation, etc., on the front and/or back sides or pages of one or more sheets of paper or other printable media. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 200 may be a stand-alone printer or a cluster of networked or otherwise logically interconnected printers, with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

As shown in FIGS. 2-4, a characterization system 124 is operatively coupled with (and may be implemented integrally to) the system controller 122. In one exemplary embodiment, the characterization system 124 is implemented as a processor-based system having suitable processing and memory components programmed or configured to implement the characterization process 2 and other functionality as described herein. As shown in FIG. 4, the characterization system 124 includes a processing element 124a and memory 124b and employs suitable program instructions and/or dedicated or programmable logic to generate the forward color transform 125 that maps color from a first color space to a second color space for the device 100, 200. In particular, the processor 124a is operative to compute forward color transform parameters $\Theta_L$, $\Theta_a$, $\Theta_b$ for a forward color transform $f_\Theta(cmyk)$ 125 that maps color from a C, M, Y, K space associated with the internal color representation of the system 100, 200 (or a color marking material design process as described in connection with FIG. 7) into a second color space (e.g., CIELAB) using a least squares minimization of an error metric weighted according to a Taylor series expansion of the error metric at least partially according to the input characterization data set 122a and the measured characterization data set 122b.

Figure 6:
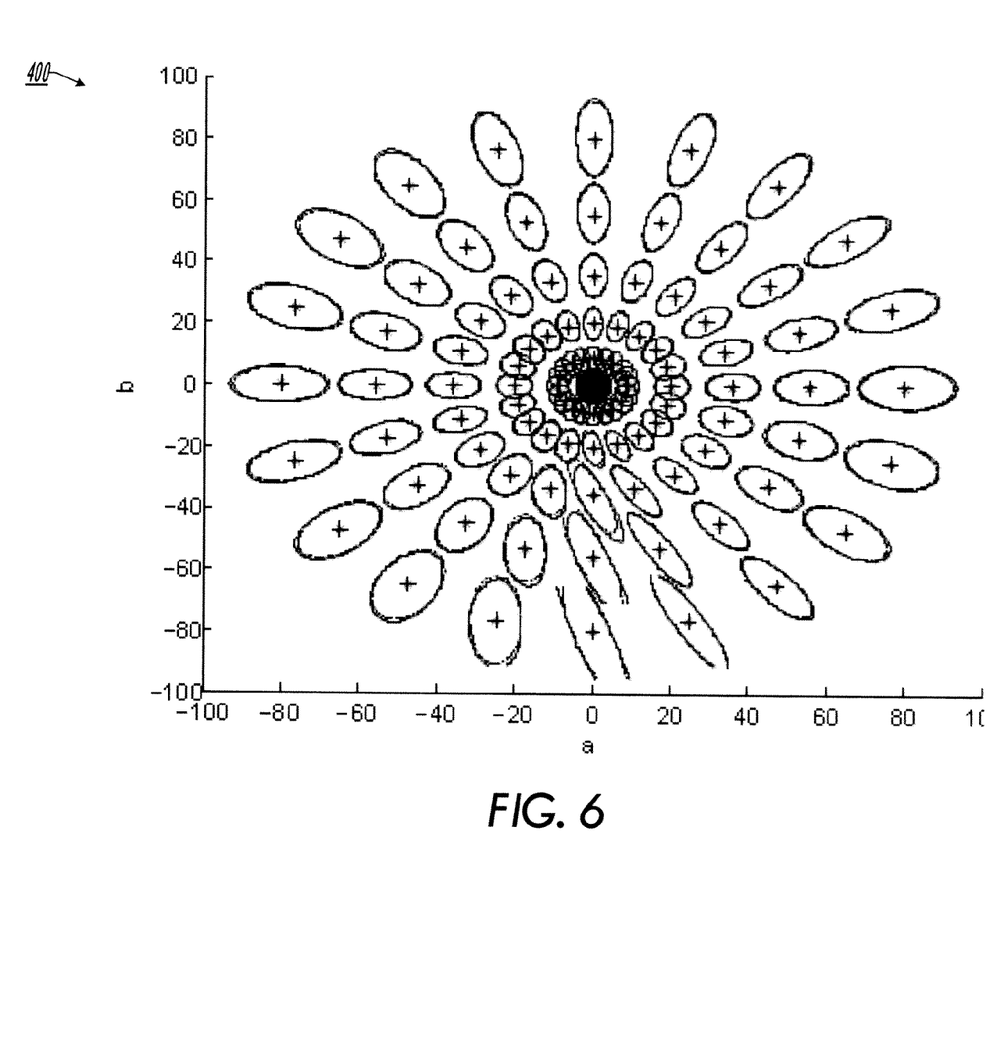
FIG. 6 is a graph illustrating an exemplary constant L portion of the CIELAB space showing contours of a Taylor approximation (dashed) and an actual dE2K error metric (solid)

Referring to FIGS. 5A, 5B, and 6, given two points in the La*b* space, $Lab_1$ and $Lab_2$, the dE2K formula can be evaluated to determine the color difference, as perceived by humans, $dE2K(Lab_1, Lab_2)$. As shown in FIGS. 5A and 5B, however, the dE2K formula is a very cumbersome difference formula based on the CIELAB color space (the notation $\Delta E_{00}^{12}$ is used in FIGS. 5A and 5B to indicate the dE2K color difference between a pair of CEILAB color space values $Lab_1=(L_1^*, a_1^*, b_1^*)$ and $Lab_2=(L_2^*, a_2^*, b_2^*)$. The dE2K formula implements a spatially varying distance metric, which is locally approximately quadratic. This is shown in a graph 400 in FIG. 6 for a constant-L slice of the La*b* space, where dE2K contours (solid lines in FIG. 6) around any particular point in the La*b* space are roughly elliptical, meaning that the metric is approximately quadratic, where the dashed lines in the graph 400 show the closeness of the approximation possible using the techniques of the present disclosure.

The second order Taylor expansion of a function gives a locally quadratic approximation of that function. For a twice differentiable function $f$ which maps points $x \in R^n$ to R, the second order Taylor expansion of $f$ about a point $x_o$ given by the following equation (1):

$$f(x_0 + \delta x) \approx f(x_0) + [\nabla f(x_0)]^T \cdot \delta x + \frac{1}{2} \delta x^T \cdot [\nabla^2 f(x_0)] \cdot \delta x + \dots, \quad (1)$$

where $\nabla f(x_0)$ and $\nabla^2 f(x_0)$ are, respectively, the gradient and the second derivative matrix (Hessian matrix) at $x_0$ as seen in the following equations (2):

$$\nabla f(x) = \left( \frac{\partial f}{\partial x_1}(x), \dots, \frac{\partial f}{\partial x_n}(x) \right) \quad (2)$$

$$\nabla^2 f(x) = \left[ \frac{\partial^2 f}{\partial x_i \partial x_j}(x) \right]$$

If $f$ is difficult to differentiate analytically, then the gradient and the Hessian can be approximated in the Taylor expansion using the following numerical approximations in equations (3) for the partials:

$$\frac{\partial f}{\partial x_i}(x) = \frac{f(x + he_i) - f(x)}{h} \quad (3)$$

$$\frac{\partial^2 f}{\partial x_i \partial x_j}(x) = \frac{\frac{\partial f}{\partial x_j}(x + he_i) - \frac{\partial f}{\partial x_j}(x)}{h^2},$$

where $e_i$ the ith unit vector and $h>0$ is some sufficiently small number.

The color printer systems 100, 200 above can be viewed as a device which maps a digital input C, M, Y, K first color space into the physical output La*b* second color space. Computing a parameterized printer model from given input/output data is the process of finding a parametrized function which captures the printer mapping as closely as possible. Denoting $f_\Theta(cmyk)$ as a parametrized forward transform function or model, $\Theta=(\theta_1, \dots, \theta_n) \in R^n$ is a vector of parameters, where $f_\Theta: R^4 \mapsto R^3$, and $f_\Theta: (cmyk) \mapsto (Lab)$. In this case, $f_\Theta: R^4 \mapsto R^3$ has three components:

$$f_\Theta(cmyk) = \begin{bmatrix} f_{\Theta,L}(cmyk) \\ f_{\Theta,a}(cmyk) \\ f_{\Theta,b}(cmyk) \end{bmatrix},$$

where each of $f_{\Theta,L}$, $f_{\Theta,a}$, $f_{\Theta,b}$ maps $R^4$, $\mapsto R^1$, and L, a, and b can be characterized separately as functions of CMYK values. The present disclosure addresses linearly parametrized models which can be computed using efficient least-squares methods. For example, if $f_\Theta(cmyk)$ is an nth order polynomial parametrization, then $\Theta$ would be the coefficients and $$f_\Theta(cmyk) = \begin{bmatrix} f_{\Theta,L}(cmyk) \\ f_{\Theta,a}(cmyk) \\ f_{\Theta,b}(cmyk) \end{bmatrix} = \begin{bmatrix} \rho(cmyk)^T \Theta_L \\ \rho(cmyk)^T \Theta_a \\ \rho(cmyk)^T \Theta_b \end{bmatrix} = R(cmyk)\Theta,$$

where $R(cmyk)=[I_3 \otimes \rho(cmyk)^T]$ and $\Theta=(\Theta_L, \Theta_a, \Theta_b)$, and $\rho(cmyk)$ is a vector of all possible products of the cmyk values that appear in an $n^{th}$ order polynomial. Given input/output data $\{(cmyk_i, Lab_i)\}_{i=1}^N$, where $cmyk_i \in R^4$ and $Lab_i \in R^3$, a printer model computation problem becomes finding $\Theta=(\Theta_L, \Theta_a, \Theta_b)$ which solves the following equation (4):

$$\min_\Theta \sum_{i=1}^N dE2K(f_\Theta(cmyk_i), Lab_i). \quad (4)$$

In this regard, $\Theta_L$ or $\Theta_a$ or $\Theta_b$ can be written as a vector row of cmyk times the $\Theta_L$ or times the $\Theta_a$ or times the $\Theta_b$, and can be represented as some R matrix times which is the stacked $\Theta_L \Theta_a \Theta_b$, where the R matrix replicates that row matrix three times so that multiplying R by $\Theta$ yields $f_\Theta$(cmyk). However, because of the computational intractability of the dE2K formula, most methods to date instead solve a surrogate problem which, in the case of linearly parametrized $f_\Theta$, can be solved efficiently using least squares as shown in equation (5):

$$\min_\Theta \sum_{i=1}^N \|f_\Theta(cmyk_i) - Lab_i\|_2^2 \equiv \min_\Theta \sum_{i=1}^N \|R(cmyk_i)\Theta - Lab_i\|_2^2. \quad (5)$$

The present disclosure involves application of a numerical second order Taylor expansion idea to the dE2K metric, to obtain a more accurate surrogate problem. The new surrogate is still a least squares problem, but uses a weighting that is explicitly derived from the dE2K metric, thus giving a better approximation to (4). In this regard, the dE2K metric is symmetric, in the sense that $dE2K(Lab_i, Lab_j) = dE2K(Lab_j, Lab_i)$, and thus can be rewritten as:

$$dE2K(Lab_i, Lab_j) = dE2K(Lab_i, Lab_i + (Lab_j - Lab_i)),$$

$$:= dE2K_i(Lab_i + \delta Lab)$$

where $\delta Lab = Lab_j - Lab_i$. Applying a second order Taylor expansion formula, yields the following equation (6):

$$dE2K_i(Lab_i + \delta Lab) = dE2K_i(Lab_i) + \quad (6)$$

$$[\nabla dE2K_i(Lab_i)]^T \cdot \delta Lab + \frac{1}{2} \delta Lab^T \cdot [\nabla^2 dE2K_i(Lab_i)] \cdot \delta Lab + \ldots$$

In this formulation, it is noted that $dE2K_i(Lab_i) = dE2K(Lab_i, Lab_i) = 0$, since the dE2K distance of any La*b* to itself is zero, and $\nabla dE2K_i(Lab_i) = 0$ because the function $dE2K_i(Lab_i)$ attains its minimum (zero), therefore its gradient must be zero at that point (e.g., local minima or local maxima). As a result, the second order Taylor expansion of equation (6) simplifies to a pure quadratic in equation (7):

$$dE2K_i(Lab_i + \delta Lab) = \quad (7)$$

$$\frac{1}{2} \delta Lab^T \cdot [\nabla^2 dE2K_i(Lab_i)] \cdot \delta Lab = \frac{1}{2} \|Q^{1/2}(Lab_i) \cdot \delta Lab\|_2^2,$$

where $Q(Lab_i) := [\nabla^2 dE2K_i((Lab_i)]$. Due to the complexity of the dE2K formula, these can be computed numerically using the above equation (3). The contours of the "Hessian" (second order Taylor) approximation in equation (7) are shown as dashed lines in the graph 400 of FIG. 6 along with the contours of the actual dE2K function (solid lines), and thus the approximation is very good.

Applying this to the terms in the summation in the above equation (4), the problem can be approximated with the following equation (8):

$$\min_\Theta \sum_{i=1}^N dE2K(f_\Theta(cmyk_i), Lab_i) \equiv \quad (8)$$

$$\min_\Theta \sum_{i=1}^N dE2K_i(Lab_i + (f_\Theta(cmyk_i) - Lab_i)) \approx$$

$$\min_\Theta \sum_{i=1}^N \frac{1}{2} \|Q^{1/2}(Lab_i) \cdot (f_\Theta(cmyk_i) - Lab_i)\|_2^2.$$

In the case of a linear parametrization, such as polynomial, this yields a weighted least squares problem in the desired forward transform parameters $\Theta$:

$$\min_\Theta \sum_{i=1}^N \frac{1}{2} \|Q^{1/2}(Lab_i) \cdot (R(cmyk_i) \cdot \Theta - Lab_i)\|_2^2. \quad (9)$$

The results of using the approximation (9) of the dE2K explicitly in the design phase computation of the color model parameters is shown in the table below for a global third order polynomial fit on $16^4$ points of (cmyk, La*b*) input-output data taken uniformly spaced along each axis in the cmyk space. There is a 10% improvement in the max fitting errors, and a 5% reduction in the 95-percentile and average errors, while the minimum is relatively unchanged.

| method | min | avg | 95% | max |
| --- | --- | --- | --- | --- |
| Standard LS (5) | 0.02 | 1.09 | 2.12 | 6.10 |
| Quadratic WLS (9) | 0.03 | 1.05 | 2.02 | 5.38 |

In summary, the DeltaE2000 (dE2K) metric is currently the primary scoring function $f$ or measuring the accuracy of color models used in characterizing printing and display devices. Unfortunately, the dE2K metric has a very complicated functional representation, as a result, current color characterization methods in use today do not use the dE2K metric explicitly in the computation of their color model parameters. In this report, we show how to use the DeltaE2000 more explicitly in the printer color model computation phase, by using weights obtained from the second order Taylor expansion. This gives us local quadratic approximations to the dE2K function, which are then used to construct a weighted least squares problem, which more accurately captures the spatial inhomogeneity of the dE2K function. The functional complexity of the dE2K metric is circumvented by doing the differentiation numerically. Preliminary studies show that color models computed with this technique are 5-10% more accurate, as compared to the standard methods; and if implemented as part of a multicell method, the gains could be even larger.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of characterizing a color rendering system or a color marking material design process, or display process, the method comprising:
producing a plurality of visible test images according to an input characterization data set of a first color space using the color rendering system or color marking material design process;
measuring the test images to generate a measured characterization data set in a second color space representing measurements of observed color values; and
using a processor, computing forward color transform parameters for a forward color transform that maps color from the first color space associated with an internal color representation of the color rendering system or the color marking material design process into the second color space using a least squares minimization of an error metric weighted according to a Taylor series expansion of the error metric at least partially according to the input characterization data set and the measured characterization data set.

2. The method of claim 1, where the error metric is a twice differentiable error metric, where the distance from any point to itself is zero for the error metric, and where the first derivative of the error metric at zero distance from any point is zero.

3. The method of claim 2, where the first color space is a three or four dimensional space comprising cyan (C), magenta (M), and yellow (Y); and where the second color space is a three dimensional CIELAB space comprising L, a, and b.

4. The method of claim 3, where the error metric is weighted according to a gradient and a Hessian of the error metric evaluated at each point in the input characterization data set.

5. The method of claim 4, where the gradient and the Hessian of the error metric are evaluated at each point in the input characterization data set using the following equations:

$$\nabla f(x) = \left(\frac{\partial f}{\partial x_1}(x), \ldots, \frac{\partial f}{\partial x_n}(x)\right)$$

$$\nabla^2 f(x) = \left[\frac{\partial^2 f}{\partial x_i \partial x_j}(x)\right],$$

where x are the data points in the input characterization data set.

6. The method of claim 5, where the error metric is weighted according to approximations of the gradient the Hessian evaluated using numerical differentiation.

7. The method of claim 6, where the gradient and the Hessian of the error metric are evaluated at each point in the input characterization data set using the following equations:

$$\frac{\partial f}{\partial x_i}(x) = \frac{f(x + he_i) - f(x)}{h}$$

$$\frac{\partial^2 f}{\partial x_i \partial x_j}(x) = \frac{\frac{\partial f}{\partial x_j}(x + he_i) - \frac{\partial f}{\partial x_j}(x)}{h^2},$$

where x are the data points in the measured characterization data set, h is a small positive number, and $e_i$ are unit vectors in the second color space.

8. The method of claim 7, where the first color space is a four dimensional space comprising cyan (C), magenta (M), yellow (Y), and black (K), and where forward color transform parameters $\Theta_L$, $\Theta_a$, and $\Theta_b$ are computed for a forward color transform $f_\Theta(cmyk)$ using a weighted least squares minimization of the following equation:

$$\min_\Theta \sum_{i=1}^{N} \frac{1}{2} \|Q^{1/2}(Lab_i) \cdot (f_\Theta(cmyk_i) - Lab_i)\|_2^2,$$

where $cmyk_i$ are data points of the input characterization data set, $Lab_i$ are data points of the measured characterization data set, and $Q^{1/2}(Lab_i)$ is an error metric weighting determined according to a Taylor series expansion of the error metric.

9. The method of claim 8, where $Q^{1/2}(Lab_i)$ the second derivative matrix of the error metric.

10. The method of claim 9, where the error metric is a DeltaE2000 (dE2K) error metric, and where $Q^{1/2}(Lab_i)$ is the second derivative matrix $\nabla^2 dE2K_i(Lab_i)$ of the dE2K error metric approximated using the following equations:

$$\frac{\partial dE2K_i(Lab_i)}{\partial Lab_i} = \frac{dE2K_i(Lab_i + he_i) - dE2K_i(Lab_i)}{h}$$

$$\frac{\partial^2 dE2K_i(Lab_i)}{\partial Lab_i \delta Lab_j} = \frac{\frac{\partial dE2K_i(Lab_i + he_i)}{\partial Lab_j} - \frac{\partial dE2K_i(Lab_i)}{\partial Lab_j}}{h^2},$$

where $Lab_i$ are data points in the measured characterization data set, h is a small positive number, and $e_i$ are unit vectors in the second color space.

11. The method of claim 1, where the error metric is weighted according to a gradient and a Hessian of the error metric evaluated at each point in the measured characterization data set.

12. The method of claim 11, where the error metric is weighted according to approximations of the gradient the Hessian evaluated using numerical differentiation.

13. The method of claim 12, where the error metric is a DeltaE2000 (dE2K) error metric.

14. The method of claim 11, where the error metric is a DeltaE2000 (dE2K) error metric.

15. The method of claim 1, where the error metric is a DeltaE2000 (dE2K) error metric.

16. The method of claim 1, where the test images are produced using the color rendering system, and where the forward color transform maps color from the first color space associated with an internal color representation of the color rendering system into the second color space.

17. The method of claim 1, where the test mages are produced using materials created according to the color marking material design process, and where the forward color transform maps color from the first color space associated with an internal color representation of the color marking material design process into the second color space.

18. The method of claim 1, where the test images are produced using a display process, and where the forward color transform maps color from the first color space associated with an internal color representation of the display process into the second color space.

19. A characterization system for characterizing a color rendering system, a color marking material design process, or a display process, comprising:
a processor operative to compute forward color transform parameters for a forward color transform that maps color from a first color space associated with an internal color representation of the color rendering system or the color marking material design process or the display process into a second color space using a least squares minimization of an error metric weighted according to a Taylor series expansion of the error metric at least partially according to an input characterization data set of a first color space and a measured characterization data set in a second color space representing measurements of observed color values.

20. The characterization system of claim 19, where the error metric is a DeltaE2000 (dE2K) error metric, where the first color space is a three or four dimensional space comprising cyan (C), magenta (M), and yellow (Y), and where the second color space is a three dimensional CIELAB space comprising L, a, and b.

21. The characterization system of claim 20, where the first color space is a four dimensional space comprising cyan (C), magenta (M), yellow (Y), and black (K), where forward color transform parameters $\Theta_L$, $\Theta_a$, and $\Theta_b$ are computed for a forward color transform $f_\Theta(cmyk)$ using a weighted least squares minimization of the following equation:

$$\min_\Theta \sum_{i=1}^N \frac{1}{2} \|Q^{1/2}(Lab_i) \cdot (f_\Theta(cmyk_i) - Lab_i)\|_2^2,$$

where $cmyk_i$ are data points of the input characterization data set, $Lab_i$ are data points of the measured characterization data set, and $Q^{1/2}(Lab_i)$ is an error metric weighting determined according to a Taylor series expansion of the dE2K error metric.

22. The characterization system of claim 21, where $Q^{1/2}(Lab_i)$ is the second derivative matrix $\nabla^2 dE2K_i(Lab_i)$ of the dE2K error metric computed using the following equations:

$$\frac{\partial dE2K_i(Lab_i)}{\partial x_i} = \frac{dE2K_i(Lab_i + he_i) - dE2K_i(Lab_i)}{h}$$

$$\frac{\partial^2 dE2K_i(Lab_i)}{\partial x_i \partial x_j} = \frac{\frac{\partial dE2K_i(Lab_i + he_i)}{\partial x_j} - \frac{\partial dE2K_i(Lab_i)}{\partial x_j}}{h^2},$$

where $Lab_i$ are points in the measured characterization data set, h is a small positive number, and $e_i$ are unit vectors in the second color space.

23. The characterization system of claim 19, where the forward color transform maps color from the first color space associated with an internal color representation of a color rendering system into the second color space.

24. The characterization system of claim 23, where characterization system is integrated in the color rendering system.

25. The system of claim 19, where the forward color transform maps color from the first color space associated with an internal color representation of the color marking material design process into the second color space.

26. The system of claim 19, where the forward color transform maps color from the first color space associated with an internal color representation of the display process into the second color space.

* * * * *